United States Patent
Koiwa et al.

(10) Patent No.: US 10,230,118 B2
(45) Date of Patent: Mar. 12, 2019

(54) METHOD FOR CONTROLLING FUEL CELL SYSTEM

(71) Applicant: HONDA MOTOR CO., LTD., Tokyo (JP)

(72) Inventors: Nobuki Koiwa, Wako (JP); Osamu Ogami, Wako (JP); Takashi Yamamoto, Wako (JP); Yusai Yoshimura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 53 days.

(21) Appl. No.: 15/430,541

(22) Filed: Feb. 13, 2017

(65) Prior Publication Data

US 2017/0250425 A1 Aug. 31, 2017

(30) Foreign Application Priority Data

Feb. 29, 2016 (JP) ................................. 2016-036708

(51) Int. Cl.
*H01M 8/04858* (2016.01)
*H01M 8/04537* (2016.01)

(52) U.S. Cl.
CPC ... *H01M 8/04895* (2013.01); *H01M 8/04634* (2013.01)

(58) Field of Classification Search
CPC .................. H01M 8/04895; H01M 8/04634
See application file for complete search history.

(56) References Cited

U.S. PATENT DOCUMENTS

| | | | |
|---|---|---|---|
| 8,043,753 B2 * | 10/2011 | Mohri ............... | H01M 8/04126 429/413 |
| 9,093,679 B2 * | 7/2015 | Morita .............. | H01M 8/04388 |
| 9,640,818 B2 * | 5/2017 | Furuyama .......... | H01M 8/0488 |
| 2008/0187790 A1 * | 8/2008 | Kamihara ......... | H01M 8/04231 429/429 |

(Continued)

FOREIGN PATENT DOCUMENTS

| | | |
|---|---|---|
| JP | 2005-197008 | 7/2005 |
| JP | 2009-043687 | 2/2009 |

(Continued)

OTHER PUBLICATIONS

Japanese Office Action for corresponding JP Application No. 2016-036708, dated Jul. 25, 2017.

*Primary Examiner* — Abdullah Riyami
*Assistant Examiner* — Nader Alhawamdeh
(74) *Attorney, Agent, or Firm* — Mori & Ward, LLP (57) ABSTRACT

A method for controlling a fuel cell system including a fuel cell, includes measuring an impedance of the fuel cell that includes a solid polymer electrolyte membrane to generate electric power via an electrochemical reaction between a fuel gas and an oxidant gas. An output electric current output from the fuel cell is increased to a threshold electric current value when the impedance is equal to or higher than a threshold impedance value and a target electric current value is larger than the threshold electric current value. The output electric current is maintained at the threshold electric current value. The output electric current is increased from the threshold electric current value to the target electric current value.

18 Claims, 3 Drawing Sheets

(56) References Cited

U.S. PATENT DOCUMENTS

2012/0015257 A1\* 1/2012 Arisawa .................. B60K 1/04
 429/400
2012/0077102 A1\* 3/2012 Morita .............. H01M 8/04388
 429/429
2013/0095402 A1\* 4/2013 Furuyama ........... H01M 8/0488
 429/427

FOREIGN PATENT DOCUMENTS

| JP | 2009-158383 | 7/2009 |
| JP | 2009-135066 | 8/2009 |

\* cited by examiner

METHOD FOR CONTROLLING FUEL CELL SYSTEM

CROSS-REFERENCE TO RELATED APPLICATIONS

The present application claims priority under 35 U.S.C. § 119 to Japanese Patent Application No. 2016-036708, filed Feb. 29, 2016, entitled "Method for Controlling Fuel Cell System." The contents of this application are incorporated herein by reference in their entirety.

BACKGROUND

1. Field

The present disclosure relates to a method for controlling a fuel cell system.

2. Description of the Related Art

A solid polymer electrolyte fuel cell includes a membrane electrode assembly (MEA), in which an anode electrode is disposed on one surface of an electrolyte membrane, which is a proton-conductive polymer ion-exchange membrane, and a cathode electrode is disposed on the other surface of the electrolyte membrane. The membrane electrode assembly and separators, sandwiching the membrane electrode assembly, constitute a power generation cell (unit cell). Typically, a predetermined number of power generation cells are stacked and, for example, mounted in a fuel cell vehicle (a fuel cell electric automobile or the like) as a vehicle fuel cell stack.

The fuel cell generates electric power by causing an electrochemical reaction between a fuel gas (such as hydrogen gas) supplied to the anode electrode and an oxidant gas (such as compressed air) supplied to the cathode electrode. During power generation, protons are generated at the anode electrode, and the protons are conducted through the electrolyte membrane and move to the cathode electrode. At the cathode electrode, protons, electrons, and oxygen in the oxidant gas react to generate water.

The electrolyte membrane needs to be moist so that the electrolyte membrane can conduct protons. For this purpose, the generated water and moisture added to the oxidant gas keep the electrolyte membrane moist. However, for example, when the output electric current of the fuel cell is small, the electrochemical reaction is not accelerated, and therefore the amount of generated water is small. Accordingly, the electrolyte membrane becomes drier. In this state, the impedance of the fuel cell increases.

Japanese Unexamined Patent Application Publication No. 2009-135066 describes estimating the impedance when the impedance is not measurable and performing an operation for moistening a fuel cell, and performing control for forbidding an operation of a fuel cell in a dry state. Thus, the fuel cell is operated so as to prevent the electrolyte membrane from becoming dry.

SUMMARY

According to one aspect of the present invention, a method for controlling a fuel cell system is provided. The fuel cell system includes a fuel cell that includes a solid polymer electrolyte membrane and that generates electric power by causing an electrochemical reaction between a fuel gas and an oxidant gas, a fuel gas supply device that supplies the fuel gas into the fuel cell, an oxidant gas supply device that supplies the oxidant gas into the fuel cell, and an impedance measuring unit that measures an impedance of the fuel cell. The method includes increasing an output electric current of the fuel cell to a required output electric current after continuing generation of electric power at a predetermined threshold electric current value when the impedance measured by the impedance measuring unit is higher than or equal to a predetermined threshold impedance value and the output electric current reaches the predetermined threshold electric current value in a process of increasing the output electric current to the required output electric current.

According to another aspect of the present invention, a method for controlling a fuel cell system including a fuel cell, includes measuring an impedance of the fuel cell that includes a solid polymer electrolyte membrane to generate electric power via an electrochemical reaction between a fuel gas and an oxidant gas. An output electric current output from the fuel cell is increased to a threshold electric current value when the impedance is equal to or higher than a threshold impedance value and a target electric current value is larger than the threshold electric current value. The output electric current is maintained at the threshold electric current value. The output electric current is increased from the threshold electric current value to the target electric current value.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Hereinafter, an embodiment of a method for controlling a fuel cell system according to the present disclosure will be described in detail with reference to the drawings. In the present embodiment, an example in which the fuel cell system is mounted in a fuel cell vehicle, such as a fuel cell electric automobile, is described.

First, a fuel cell system 10 will be described with reference to FIG. 1, which is a schematic diagram. The fuel cell system 10 includes a fuel cell stack 12 (fuel cell).

The fuel cell stack 12 includes a fuel gas supply device 14 that supplies a fuel gas, an oxidant gas supply device 16 that supplies an oxidant gas, and a coolant supply device 18 that supplies a coolant. In the present embodiment, hydrogen gas is used as the fuel gas, and compressed air is used as the oxidant gas. The fuel cell system 10 further includes a battery 20 (storage battery) that is an energy storage device, a controller 22 that is a system control device, and an impedance measuring unit 23.

Figure 1:
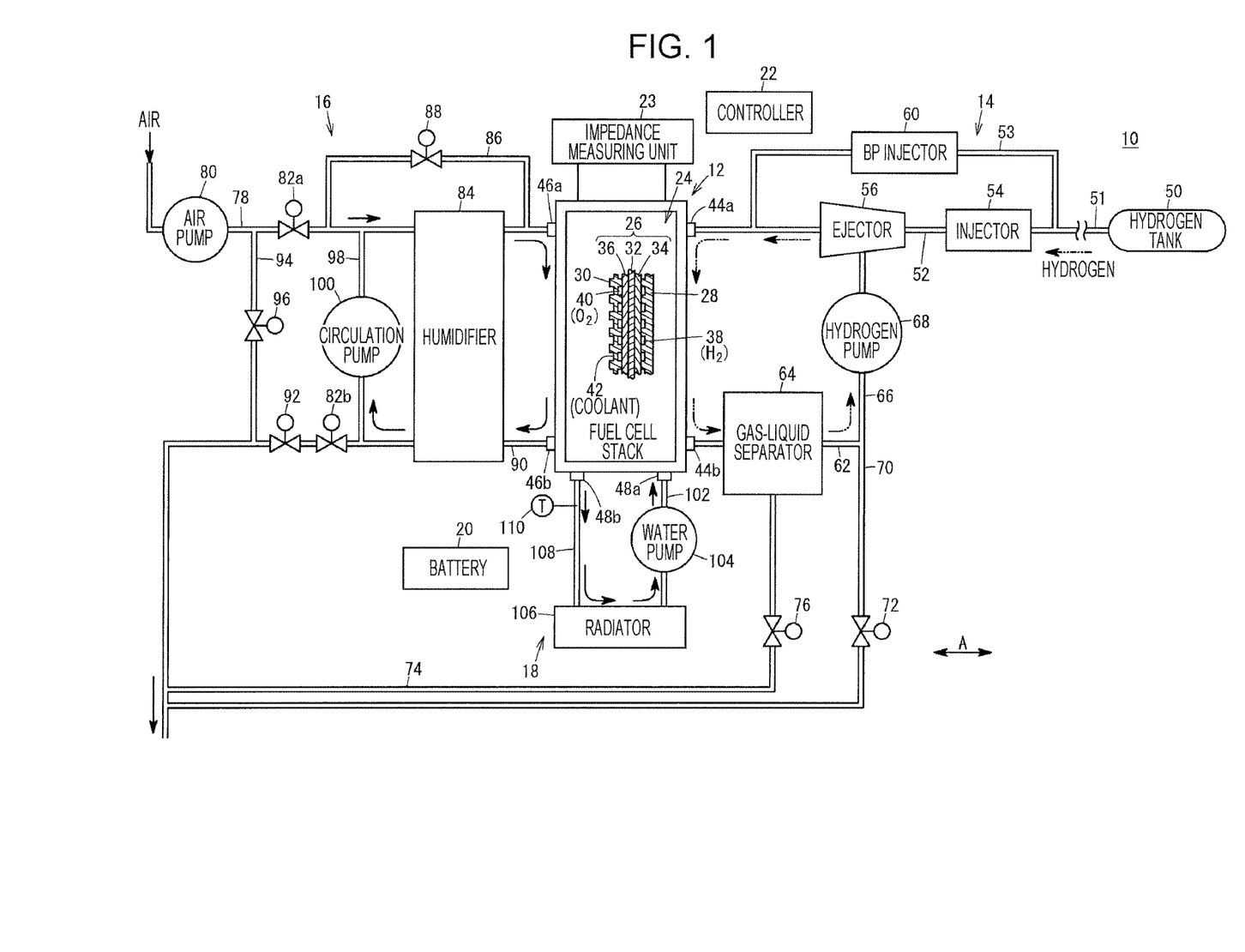
FIG. 1 is a schematic diagram of a fuel cell system to which a method according to an embodiment of the present disclosure is applied.

In FIG. 1, for ease of understanding, the controller 22 and the impedance measuring unit 23 are independently illustrated. In reality, however, the impedance measuring unit 23 is a part of the controller 22. As described below, the impedance measuring unit 23 determines whether a solid polymer electrolyte membrane 32 is likely to become dry or likely to become moist on the basis of the impedance value of the fuel cell stack 12 (power generation cells 24).

The fuel cell stack 12 includes a plurality of power generation cells 24 that are stacked in the direction of arrow A (a horizontal direction or a vertical direction) in FIG. 1. In each of the power generation cells 24, a membrane electrode assembly 26 is sandwiched between a first separator 28 and a second separator 30. The first separator 28 and the second separator 30 are made of metal or carbon.

The membrane electrode assembly 26 includes, for example, the solid polymer electrolyte membrane 32, which is a thin water-soaked perfluorosulfonic acid membrane, and an anode electrode 34 and a cathode electrode 36 that sandwich the solid polymer electrolyte membrane 32. Instead of a fluoropolymer electrolyte, a hydrocarbon (HC) electrolyte may be used as the solid polymer electrolyte membrane 32.

A hydrogen gas channel 38 (fuel gas channel), for supplying hydrogen gas to the anode electrode 34, is formed on a surface of the first separator 28 facing the membrane electrode assembly 26. An air channel 40, for supplying air to the cathode electrode 36, is formed on a surface of the second separator 30 facing the membrane electrode assembly 26. A coolant channel 42, through which a coolant flows, is formed between the first separator 28 and the second separator 30 that are adjacent to each other.

The fuel cell stack 12 has a hydrogen gas inlet 44a, a hydrogen gas outlet 44b, an air inlet 46a, an air outlet 46b, a coolant inlet 48a, and a coolant outlet 48b. The hydrogen gas inlet 44a extends through the power generation cells 24 in the stacking direction and is connected to the supply side of the hydrogen gas channel 38. Likewise, the hydrogen gas outlet 44b extends through the power generation cells 24 in the stacking direction and is connected to the discharge side of the hydrogen gas channel 38. The hydrogen gas channel 38, the hydrogen gas inlet 44a, and the hydrogen gas outlet 44b constitute an anode channel.

Likewise, the air inlet 46a extends through the power generation cells 24 in the stacking direction and is connected to the supply side of the air channel 40. The air outlet 46b extends through the power generation cells 24 in the stacking direction and is connected to the discharge side of the air channel 40. The air channel 40, the air inlet 46a, and the air outlet 46b constitute a cathode channel.

The coolant inlet 48a extends through the power generation cells 24 in the stacking direction and is connected to the supply side of the coolant channel 42. The coolant outlet 48b extends through the power generation cells 24 in the stacking direction and is connected to the discharge side of the coolant channel 42.

The fuel gas supply device 14 includes a hydrogen tank 50 that stores high-pressure hydrogen gas. The hydrogen tank 50 is connected to the hydrogen gas inlet 44a of the fuel cell stack 12 through a hydrogen gas supply passage 51 (fuel gas supply channel). The hydrogen gas is supplied to the fuel cell stack 12 through the hydrogen gas supply passage 51.

The hydrogen gas supply passage 51 includes a main channel 52 and a hydrogen bypass channel 53. In the main channel 52, an injector 54 and an ejector 56 are arranged in series. The hydrogen bypass channel 53 branches off from the main channel 52 at a position upstream of the injector 54 and is joined to the main channel 52 at a position downstream of the ejector 56. That is, the hydrogen bypass channel 53 bypasses the injector 54 and the ejector 56.

A BP (bypass) injector 60 is disposed in the hydrogen bypass channel 53. The BP injector 60 is a sub-injector that is used to supply a high-concentration hydrogen gas when high-load power generation is required for the fuel cell stack 12. The injector 54 is a main injector that is mainly used for a normal operation of the fuel cell stack 12 (when normally generating electric power).

A hydrogen gas discharge passage 62 (anode off-gas pipe) is connected to the hydrogen gas outlet 44b of the fuel cell stack 12. Exhaust hydrogen gas (anode off-gas), which is hydrogen gas that has at least partially been used in the anode electrode 34, is discharged from the fuel cell stack 12 through the hydrogen gas discharge passage 62.

A gas-liquid separator 64 is disposed in the hydrogen gas discharge passage 62. A hydrogen circulation channel 66 branches off from a position downstream of the gas-liquid separator 64, and a downstream portion of the hydrogen circulation channel 66 is connected to the ejector 56. A hydrogen pump 68 is disposed in the hydrogen circulation channel 66. In particular, when activated, the hydrogen pump 68 causes the anode off-gas, which has been discharged to the hydrogen gas discharge passage 62, to circulate to the hydrogen gas supply passage 51 through the hydrogen circulation channel 66 and the ejector 56.

One end of a purge channel 70 is connected to the hydrogen gas discharge passage 62, and a purge valve 72 is disposed in the purge channel 70. One end of a drain channel 74, for draining a fluid mainly including a liquid component, is connected to a bottom portion of the gas-liquid separator 64. A drain valve 76 is disposed in the drain channel 74.

The oxidant gas supply device 16 includes an air pump 80, which is disposed in an air supply passage 78 (oxidant gas supply channel) and which corresponds to an oxidant gas supply mechanism. The air pump 80 is a compressor that includes a motor, which corresponds to a rotational driving unit, and that compresses and supplies air. That is, the air pump 80 compresses air as the motor rotates and supplies the compressed air to the fuel cell stack 12 through the air supply passage 78.

The air supply passage 78 is connected to the air inlet 46a of the fuel cell stack 12 at a position downstream of the air pump 80, and a supply on-off valve 82a (inlet shut-off valve) and a humidifier 84 are disposed between the air pump 80 and the air inlet 46a. A bypass supply passage 86 (bypass channel), which bypasses the humidifier 84, is connected to the air supply passage 78. An on-off valve 88 is disposed in the bypass supply passage 86.

An air discharge passage 90 (cathode off-gas discharge passage) is connected to the air outlet 46b of the fuel cell stack 12. Exhaust compressed air (cathode off-gas), which is compressed air that has at least partially been used in the cathode electrode 36, is discharged from the fuel cell stack 12 through the air discharge passage 90.

The humidifier 84 is disposed downstream of the air discharge passage 90. Therefore, the humidifier 84 exchanges water and heat between the compressed air supplied from the air pump 80 and the cathode off-gas. A discharge on-off valve 82b (outlet shut-off valve) and a back-pressure valve 92 are disposed in the air discharge passage 90 at positions downstream of the humidifier 84. The other end of the purge channel 70 and the other end of the drain channel 74 are connected and joined to a downstream portion of the air discharge passage 90, thereby forming a diluting portion.

The back-pressure valve 92 is pressure adjusting valve that is used to control the pressure of compressed air supplied to the cathode channel. That is, the internal pressure of the cathode electrode 36 is adjusted by the back-pressure valve 92.

Two ends of an air bypass channel 94 are respectively connected to the air supply passage 78 and the air discharge passage 90 at a position upstream of the supply on-off valve 82a and at a position downstream of the discharge on-off valve 82b and downstream of the back-pressure valve 92. A BP-flow-rate adjusting valve 96, which is used to adjust the flow rate of air that flows through the air bypass channel 94, is disposed in the air bypass channel 94.

An air circulation channel 98 is connected to the air supply passage 78 and the air discharge passage 90 respectively at a position downstream of the supply on-off valve 82a and at a position upstream of the discharge on-off valve 82b. A circulation pump 100 is disposed in the air circulation channel 98. The circulation pump 100 causes discharge air, which has been discharged to the air discharge passage 90, to circulate to the air supply passage 78 through the air circulation channel 98.

The coolant supply device 18 includes a coolant supply passage 102 that is connected to the coolant inlet 48a of the fuel cell stack 12, and a water pump 104 is disposed in the coolant supply passage 102. The coolant supply passage 102 is connected to a radiator 106; and a coolant discharge passage 108, which is connected to the coolant outlet 48b, is connected to the radiator 106. A temperature sensor 110 for detecting a coolant outlet temperature is disposed in the coolant discharge passage 108.

Next, a method for controlling the fuel cell system 10 according to the present embodiment will be described in relation to the operation of the fuel cell system 10.

When starting a fuel cell vehicle including the fuel cell system 10, the ignition is turned on and the fuel cell stack 12 is activated. At this time, the controller 22 sends an instruction signal for opening the injector 54 to supply hydrogen gas from the fuel gas supply device 14 to the anode channel. Thus, a predetermined amount of hydrogen gas is supplied from the hydrogen tank 50 to the hydrogen gas supply passage 51, the hydrogen gas flows through the injector 54 and the ejector 56 of the main channel 52, and the hydrogen gas is supplied to the hydrogen gas inlet 44a of the fuel cell stack 12.

The hydrogen gas flows from the hydrogen gas inlet 44a into the hydrogen gas channel 38 and moves along the hydrogen gas channel 38. Thus, the hydrogen gas is supplied to the anode electrode 34 of the membrane electrode assembly 26.

Moreover, the controller 22 sends an instruction signal for activating the air pump 80 to supply compressed air from the oxidant gas supply device 16. Accordingly, the air pump 80 rotates to compress air and to feed the compressed air to the air supply passage 78. The compressed air is moistened while passing through the humidifier 84 and then supplied to the air inlet 46a of the fuel cell stack 12. The compressed air flows from the air inlet 46a into the air channel 40 and then moves along the air channel 40, and thereby the compressed air is supplied to the cathode electrode 36 of the membrane electrode assembly 26.

Accordingly, in the membrane electrode assembly 26, the hydrogen gas supplied to the anode electrode 34 and oxygen in the compressed air supplied to the cathode electrode 36 cause an electrochemical reaction in the electrode catalyst layers and electric power is generated. A part of moisture added to the compressed air by the humidifier 84 permeates from the cathode electrode 36 into the solid polymer electrolyte membrane 32 and reaches the anode electrode 34.

In the coolant supply device 18, the water pump 104 operates to supply a coolant, such as pure water, ethylene glycol, oil, or the like from the coolant supply passage 102 to the coolant inlet 48a of the fuel cell stack 12. The coolant flows along the coolant channel 42, cools the power generation cells 24, and then is discharged from the coolant outlet 48b to the coolant discharge passage 108.

The hydrogen gas supplied to the anode electrode 34 and partially consumed is discharged from the hydrogen gas outlet 44b to the hydrogen gas discharge passage 62 as anode off-gas. At this time, the anode off-gas carries moisture (water) that has reached the anode electrode 34 as described above. That is, the anode off-gas that flows into the gas-liquid separator 64 is a moist gas including water.

The gas-liquid separator 64 separates most of water in the anode off-gas. The liquid (water) is discharged from the drain channel 74 when the drain valve 76 is opened. The anode off-gas, from which water has been separated but in which a small amount of mist remains, flows from the hydrogen gas discharge passage 62 into the hydrogen circulation channel 66 as the hydrogen pump 68 operates. Then, the anode off-gas is sucked into the ejector 56 from the hydrogen circulation channel 66, joins a flow of new hydrogen gas that has passed through the injector 54, and is supplied to the anode channel from the hydrogen gas supply passage 51. Thus, the anode off-gas is circulated and supplied to the fuel cell stack 12.

The anode off-gas that has been discharged to the hydrogen gas discharge passage 62 is discharged (purged), as necessary, to the outside as the purge valve 72 is opened.

Likewise, compressed air that has been supplied to the cathode electrode 36 and partially consumed is discharged from the air outlet 46b to the air discharge passage 90 as cathode off-gas. The cathode off-gas flows through the humidifier 84 to humidify new compressed air supplied from the air supply passage 78, the pressure of the cathode off-gas is adjusted to a set pressure of the back-pressure valve 92, and the cathode off-gas is discharged to the diluting portion. The cathode off-gas, which has been discharged to the air discharge passage 90, is supplied from the air circulation channel 98 to the air supply passage 78 as the circulation pump 100 operates. In this case, the cathode off-gas is also circulated and supplied to the fuel cell stack 12.

Figure 3:
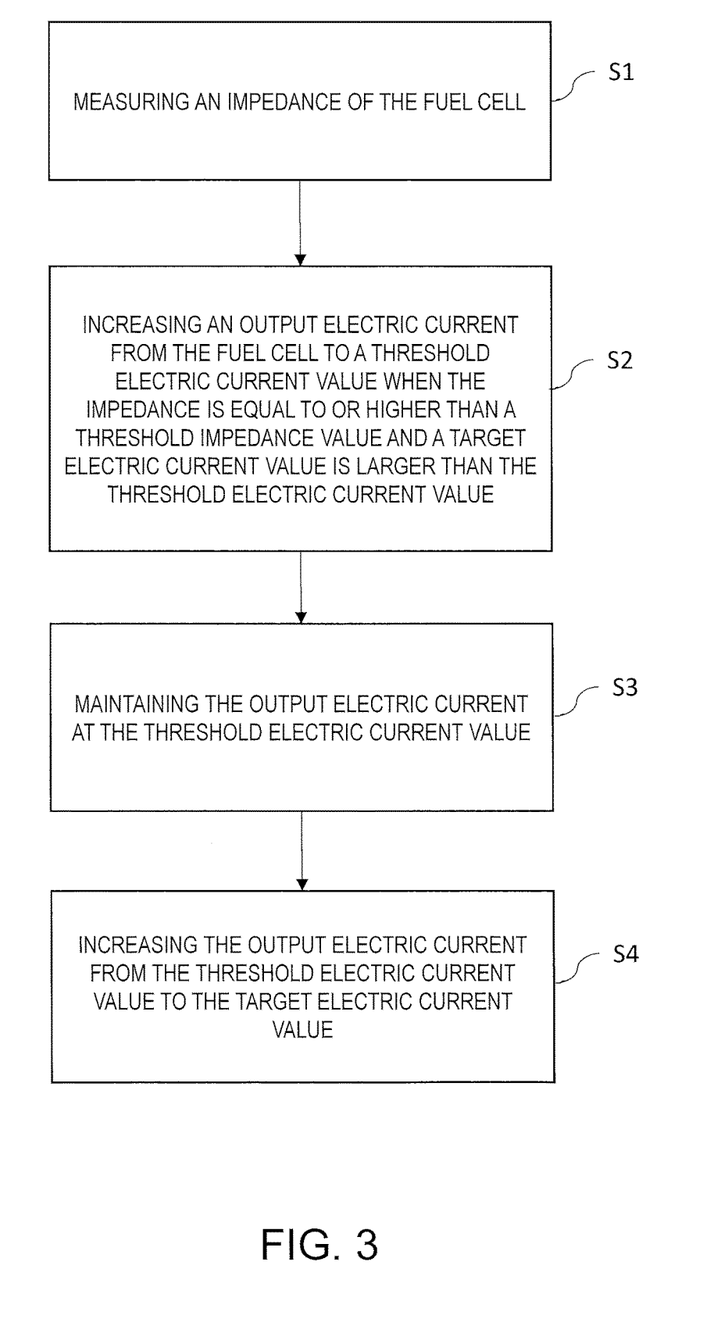
FIG. 3 is a flowchart showing a method for the fuel cell system according to an embodiment of the present disclosure.

While the fuel cell stack 12 is being operated as described above, the impedance measuring unit 23 measures the impedance of the fuel cell stack 12, to be more specific, the impedance of the power generation cells 24 (Step S1 in FIG. 3). The controller 22 constantly acquires information regarding the impedance.

When a load on the fuel cell stack 12 is low, an output electric current required for the fuel cell stack 12 is small. In this case, a required air flow rate (required oxidant gas flow rate) of the fuel cell stack 12 is also low. Therefore, the controller 22 sends a signal for "reducing the rotation speed of the motor" to the air pump 80. When receiving the signal, the air pump 80 sets the rotation speed of the motor at a low rotation speed, so that the supply amount of compressed air decreases. In particular, in an idling state, the rotation speed of the motor becomes the lowest.

Therefore, the amount of water generated in the fuel cell stack 12 is small. Because the amount of generated water is small, the amount of moisture added to the solid polymer electrolyte membrane 32 is small. Therefore, proton conduction decreases, and the impedance of the fuel cell stack 12 (the power generation cells 24) increases.

In the present embodiment, regarding the impedance, a predetermined threshold impedance value is set beforehand and stored in the controller 22. The controller 22 compares the impedance acquired from the impedance measuring unit 23 with the threshold impedance value. The controller 22 also stores a threshold electric current value beforehand.

Figure 2:
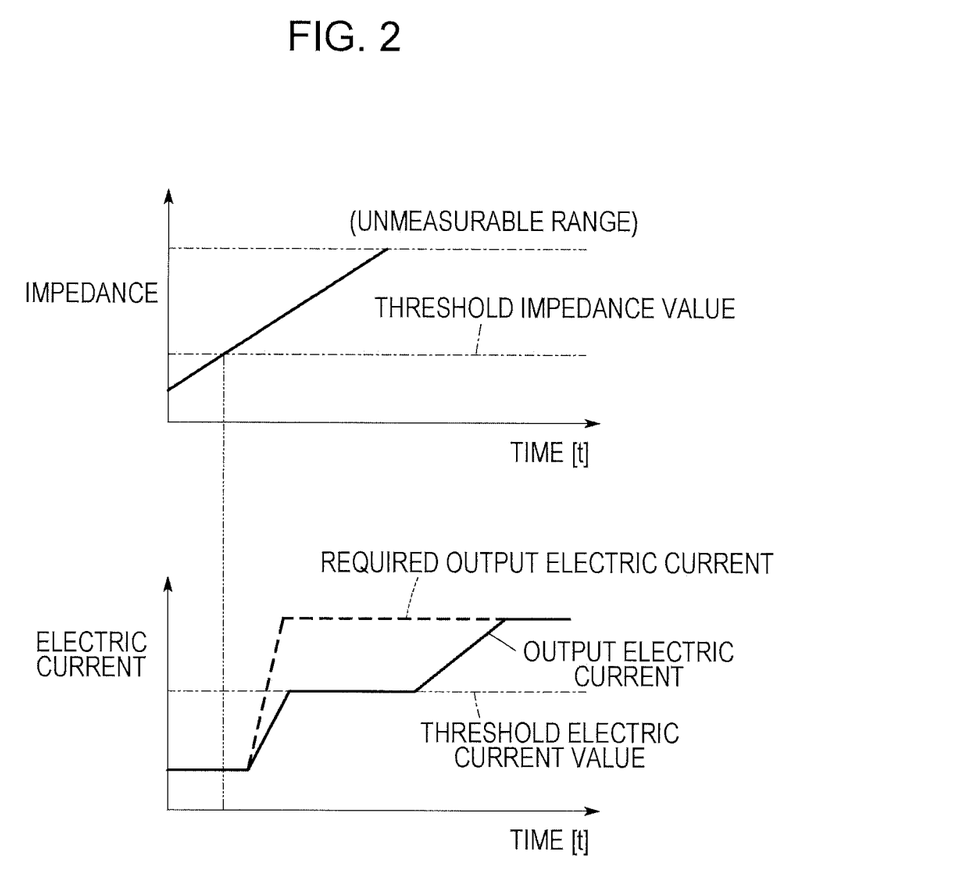
FIG. 2 is a timing chart showing the output electric current that is controlled by the method and the impedance that changes.

As illustrated in FIG. 2, when the impedance increases and reaches the threshold impedance value, the controller 22 determines that "the solid polymer electrolyte membrane 32 is likely to become excessively dry". In this state, when, for example, the driver of the fuel cell vehicle depresses the accelerator to accelerate the vehicle, an output electric current required for the fuel cell stack 12 increases.

When the solid polymer electrolyte membrane 32 is likely to become dry, proton conduction is likely to decrease as described above. Therefore, if the output electric current of the fuel cell stack 12 is increased to the required output electric current (the target electric current value), the internal resistance of the power generation cell 24 is increased. To avoid this, in the present embodiment, when output electric current reaches the threshold electric current value stored in the controller 22, electric power is generated at the threshold electric current value (Step S2 in FIG. 2).

Because the output electric current has increased, even when the fuel cell stack 12 is generating electric power while maintaining the output electric current at the threshold electric current value (Step S3 in FIG. 3), the electrochemical reaction in the membrane electrode assembly 26 is accelerated. That is, the reaction rate increases. As a result, the amount of generated water, which is generated in the cathode electrode 36 as the electrochemical reaction occurs, increases. Because the generated water adds moisture to the solid polymer electrolyte membrane 32, the solid polymer electrolyte membrane 32 becomes moist again. Thus, with the present embodiment, it is possible to prevent the solid polymer electrolyte membrane 32 from becoming dry even if a large output electric current is required when the impedance is high.

Generation of electric power at the threshold electric current value is continued, for example, until a predetermined time, which is set in the controller 22 beforehand, has elapsed. If the impedance when starting generation of electric power at the threshold electric current value is high, preferably, generation of electric power at the threshold electric current value is performed for as long as possible. That is, as the impedance increases, the duration of power generation at this stage is set longer. By doing so, sufficient amount of moisture is added to the solid polymer electrolyte membrane 32.

When a predetermined time elapses after starting generation of electric power at the threshold electric current value, the controller 22 increases the output electric current of the fuel cell stack 12 to the required output electric current (Step S4 in FIG. 3). If the output electric current increases with an acceleration when the state of the fuel cell stack 12 is changing from a state in which generation of electric power at the constant threshold electric current value is performed to a state in which the output electric current is increased, the acceleration of the fuel cell vehicle may be changed and the driver may experience an unpleasant sensation. To prevent this, when increasing the output electric current of the fuel cell stack 12 to the required output electric current, preferably, the rate of the increase is constant.

In particular, preferably, as the difference between the threshold electric current value and the required output electric current increases, the output electric current is gradually increased. In this case, from the time when the state changes to the time when the required output electric current increases, the acceleration of the fuel cell vehicle changes gradually and smoothly. Therefore, the driver can be more effectively prevented from experiencing an unpleasant sensation.

The fuel cell stack 12, whose output electric current has reached the required output electric current, can sufficiently respond to the requirement. This is because the solid polymer electrolyte membrane 32, to which sufficient amount of moisture has been added, has sufficiently high proton conductivity even when a large output electric current is required. That is, a risk that the internal resistance of the fuel cell stack 12 increases due to drying of the solid polymer electrolyte membrane 32 can be avoided.

Moreover, because the fuel cell stack 12 is being operated, an electric current can be easily obtained from the fuel cell stack 12. Also for this reason, the fuel cell stack 12 can sufficiently respond to the requirement.

In addition, because electric power generation at the constant electric current value is performed until a predetermined time elapses, a sufficient amount of moisture is added to the solid polymer electrolyte membrane 32. Accordingly, the solid polymer electrolyte membrane 32 is prevented from becoming dry. This is effective in a case where the measurement range of an electric current sensor for detecting the output electric current is wide and the impedance measuring unit 23 is not capable of detecting the impedance if the output electric current exceeds a predetermined value. This is because, even when the impedance is not accurately measurable, the solid polymer electrolyte membrane 32 becomes sufficiently moist.

The present disclosure is not limited to the embodiment described above, which can be modified in various ways within the spirit and scope of the present disclosure.

For example, in the present embodiment, generation of electric power at the threshold electric current value is continued until a predetermined time elapses. Instead, generation of electric power at the threshold electric current value may be continued until an accumulated electric current value from the time when generation of electric power at the threshold electric current value is started reaches a predetermined value.

The use of the fuel cell system 10 is not limited to a vehicle. The fuel cell system 10 may be a stationary system.

The present disclosure provides a method for controlling a fuel cell system including a fuel cell that includes a solid polymer electrolyte membrane and that generates electric power by causing an electrochemical reaction between a fuel gas and an oxidant gas, a fuel gas supply device that supplies the fuel gas into the fuel cell, an oxidant gas supply device that supplies the oxidant gas into the fuel cell, and an impedance measuring unit that measures an impedance of the fuel cell. The method includes increasing an output electric current of the fuel cell to a required output electric current after continuing generation of electric power at a predetermined threshold electric current value when the impedance measured by the impedance measuring unit is higher than or equal to a predetermined threshold impedance value and the output electric current reaches the predetermined threshold electric current value in a process of increasing the output electric current to the required output electric current.

That is, with the present disclosure, if a large output electric current is required when the impedance is higher than or equal to the predetermined threshold impedance value, the fuel cell is caused to generate electric power until predetermined conditions are satisfied while maintaining the output electric power from the fuel cell to be constant at the threshold electric current value. During the electric power generation, the electrochemical reaction in the electrodes is accelerated and the amount of generated water increases. Therefore, a sufficient amount of moisture is added to the solid polymer electrolyte membrane.

After the solid polymer electrolyte membrane has become moist in this way, the output electric current is increased to the required output electric current. At this time, because the solid polymer electrolyte membrane has sufficiently high proton conductivity, the internal resistance of the fuel cell is prevented from increasing. Moreover, because the fuel cell is generating electric power, it is not difficult to obtain an electric current from the fuel cell. For these reasons, when required to increase the output electric current, the fuel cell can quickly respond to the requirement.

Generation of electric power at the threshold electric current value may be continued until a predetermined time elapses. Alternatively, generation of electric power at the threshold electric current value may be continued until the accumulated electric current value generated by generation of electric power at the threshold electric current value reaches a predetermined value.

When performing this control, preferably, the output electric current may be increased to the required output electric current at a constant rate after generation of electric power at the threshold electric current value has been finished. In this case, the output electric current smoothly changes. Accordingly, for example, a driver driving a fuel cell vehicle in which the fuel cell system is mounted can be prevented from experiencing an unpleasant sensation due to a change in the acceleration of the fuel cell vehicle.

When starting generation of electric power at the threshold electric current value, preferably, the impedance is checked, and a time for which generation of electric power at the threshold electric current value is performed is increased as the value of the impedance increases. High impedance when starting generation of electric power indicates that the solid polymer electrolyte membrane is likely to become dry. In this case, generation of electric power at the threshold electric current value is performed for a long time, so that sufficient amount of moisture is added to the solid polymer electrolyte membrane. Accordingly, the internal resistance of the fuel cell is prevented from increasing when the output electric current is increased to the required output electric current.

When a difference between the threshold electric current value and the required output electric current is large, preferably, an increase rate of the output electric current is decreased. In other words, in such a case, the output electric current is gradually increased. Thus, the output electric current is prevented from changing sharply. As a result, for example, when driving a fuel cell vehicle, the acceleration of the fuel cell vehicle is prevented changing in a short time. Accordingly, the driver is prevented from experiencing an unpleasant sensation.

With the present disclosure, if a large output electric current is required when the impedance is higher than or equal to the predetermined threshold impedance value, instead of immediately increasing the output electric current value to the required electric current, the fuel cell is caused to generate electric power at a predetermined threshold electric current value until a predetermined time elapses. During the electric power generation at the constant electric current value, the amount of generated water increases. Therefore, a sufficient amount of moisture is added to the solid polymer electrolyte membrane.

After the solid polymer electrolyte membrane has become moist as described above, the output electric current is increased to the required output electric current. At this time, the solid polymer electrolyte membrane has sufficiently high proton conductivity, and therefore the internal resistance of the fuel cell is prevented from increasing. Moreover, because the fuel cell is generating electric power, it is not difficult to obtain an electric current from the fuel cell. Therefore, when required to increase the output electric current although the impedance is high, the fuel cell can quickly respond to the requirement.

Obviously, numerous modifications and variations of the present invention are possible in light of the above teachings. It is therefore to be understood that within the scope of the appended claims, the invention may be practiced otherwise than as specifically described herein.

What is claimed is:

1. A method for controlling a fuel cell system, the fuel cell system including
    a fuel cell that includes a solid polymer electrolyte membrane and that generates electric power by causing an electrochemical reaction between a fuel gas and an oxidant gas,
    a fuel gas supply device that supplies the fuel gas into the fuel cell,
    an oxidant gas supply device that supplies the oxidant gas into the fuel cell, and
    an impedance measuring unit that measures an impedance of the fuel cell,
the method comprising:
increasing an output electric current of the fuel cell to a required output electric current after continuing generation of electric power at a predetermined threshold electric current value when the impedance measured by the impedance measuring unit is higher than or equal to a predetermined threshold impedance value and the output electric current reaches the predetermined threshold electric current value in a process of increasing the output electric current to the required output electric current,
wherein the solid polymer electrolyte membrane is humidified by the electrochemical reaction while the generation of electric power at the predetermined threshold electric current value is continued.

2. The method according to claim 1, wherein generation of electric power at the threshold electric current value is continued until a predetermined time elapses.

3. The method according to claim 1, wherein the output electric current is increased to the required output electric current at a constant rate after generation of electric power at the threshold electric current value has been finished.

4. The method according to claim 1, wherein a time for which generation of electric power at the threshold electric current value is performed is increased as the impedance increases.

5. The method according to claim 1, wherein the output electric current is gradually increased as a difference between the threshold electric current value and the required output electric current increases.

6. A method for controlling a fuel cell system including a fuel cell, comprising:
- measuring an impedance of the fuel cell that includes a solid polymer electrolyte membrane to generate electric power via an electrochemical reaction between a fuel gas and an oxidant gas;
- increasing an output electric current output from the fuel cell to a threshold electric current value when the impedance is equal to or higher than a threshold impedance value and a target electric current value is larger than the threshold electric current value;
- maintaining the output electric current at the threshold electric current value; and
- increasing the output electric current from the threshold electric current value to the target electric current value,
- wherein the solid polymer electrolyte membrane is humidified by the electrochemical reaction while the output electric current is maintained at the threshold electric current value.

7. The method according to claim 6, wherein the output electric current is maintained at the threshold electric current value for a predetermined time.

8. The method according to claim 7, wherein the output electric current is increased to the target electric current value at a constant rate after the output electric current is maintained at the threshold electric current value for the predetermined time.

9. The method according to claim 6,
- wherein a time for which the output electric current is maintained at the threshold electric current value increases as the impedance increases.

10. The method according to claim 6,
- wherein increasing the output electric current from the threshold electric current value to the target electric current value the output electric current is increased from the threshold electric current value to the target electric current value in a gradual manner corresponding to a difference between the threshold electric current value and the target electric current value.

11. The method according to claim 6, comprising:
receiving the threshold electric current value.

12. The method according to claim 1, wherein the impedance is measured to determine whether the solid polymer electrolyte membrane is dry.

13. The method according to claim 12, wherein the solid polymer electrolyte membrane is determined to be dry if the impedance is higher or equal to the predetermined threshold impedance value.

14. The method according to claim 1, wherein an increase in an internal resistance of the fuel cell is prevented while the generation of electric power at the predetermined threshold electric current value is continued.

15. The method according to claim 6, wherein the impedance is measured to determine whether the solid polymer electrolyte membrane is dry.

16. The method according to claim 15, wherein the solid polymer electrolyte membrane is determined to be dry if the impedance is higher or equal to the threshold impedance value.

17. The method according to claim 6, wherein an increase in an internal resistance of the fuel cell is prevented while the output electric current is maintained at the threshold electric current value.

18. A method for controlling a fuel cell system,
the fuel cell system including
- a fuel cell that includes a solid polymer electrolyte membrane and that generates electric power by causing an electrochemical reaction between a fuel gas and an oxidant gas,
- a fuel gas supply device that supplies the fuel gas into the fuel cell,
- an oxidant gas supply device that supplies the oxidant gas into the fuel cell, and
- an impedance measuring unit that measures an impedance of the fuel cell, the method comprising:
- increasing an output electric current of the fuel cell to a required output electric current after continuing generation of electric power at a predetermined threshold electric current value when the impedance measured by the impedance measuring unit is higher than or equal to a predetermined threshold impedance value and the output electric current reaches the predetermined threshold electric current value in a process of increasing the output electric current to the required output electric current,
- wherein the impedance is measured to determine whether the solid polymer electrolyte membrane is dry.

* * * * *